United States Patent

Sinha et al.

(10) Patent No.: US 9,172,103 B2
(45) Date of Patent: Oct. 27, 2015

(54) TRANSIENT INLET RELATIVE HUMIDITY ESTIMATION VIA ADAPTIVE CATHODE HUMIDIFICATION UNIT MODEL AND HIGH FREQUENCY RESISTANCE

(71) Applicant: GM Global Technology Operations LLC, Detroit, MI (US)

(72) Inventors: Manish Sinha, Pittsford, NY (US);
Sergio E. Garcia, Webster, NY (US);
Todd K. Preston, Rochester, NY (US);
Edward G. Himes, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 13/741,803

(22) Filed: Jan. 15, 2013

(65) Prior Publication Data

US 2014/0199605 A1 Jul. 17, 2014

(51) Int. Cl.
*H01M 8/04* (2006.01)
*H01M 8/10* (2006.01)

(52) U.S. Cl.
CPC ...... *H01M 8/04126* (2013.01); *H01M 8/04305* (2013.01); *H01M 8/04649* (2013.01); *H01M 8/04835* (2013.01); *H01M 2008/1095* (2013.01); *Y02E 60/50* (2013.01)

(58) Field of Classification Search
CPC ..... F16K 17/36; F16K 31/047; F16K 3/0209; G05B 19/042; F17D 1/20; G05D 16/0672; G05D 16/2066; G05D 21/02
USPC ......... 429/442, 434, 411, 416, 423, 432, 439, 429/454, 408, 413, 415, 419, 430, 431, 435, 429/436, 441, 444, 50, 513, 515, 524, 61; 128/204.18, 204.21, 205.19, 205.24
See application file for complete search history.

(56) References Cited

U.S. PATENT DOCUMENTS

| | | | |
|---|---|---|---|
| 4,957,107 A * | 9/1990 | Sipin | 128/204.21 |
| 7,687,164 B2 | 3/2010 | Frost et al. | |
| 2007/0141412 A1* | 6/2007 | Becker | H01M 8/04141 429/414 |
| 2008/0311438 A1* | 12/2008 | Rutkowski et al. | 429/13 |
| 2009/0081489 A1* | 3/2009 | Frost et al. | 429/13 |
| 2011/0189569 A1 | 8/2011 | Sinha et al. | |

OTHER PUBLICATIONS

Hughes, Thomas A. Programmable Controllers [Electronic Resource] / Thomas A. Hughes. n.p.: Research Triangle Park, NC : ISA, c2005., 2005. STIC Catalog. Web. Oct. 20, 2014.*

* cited by examiner

*Primary Examiner* — Edu E Enin-Okut
*Assistant Examiner* — Haroon S Sheikh
(74) *Attorney, Agent, or Firm* — Dinsmore & Shohl LLP

(57) ABSTRACT

An apparatus and method to determine the relative humidity of a fuel cell system. A controller is cooperative with a first device and a second device to receive a valve signal and a high frequency resistance value. The controller controls the relative humidity of a fuel cell stack based on the estimation of the relative humidity of the fuel cell stack based on one or more algorithms. The controller modifies the relative humidity of the fuel cell stack through changes in the position of a valve based on at least one of the valve signal and the high frequency resistance value. In one form, the relative humidity of the fuel cell system is determined without the need of a humidity sensor.

9 Claims, 4 Drawing Sheets

TRANSIENT INLET RELATIVE HUMIDITY ESTIMATION VIA ADAPTIVE CATHODE HUMIDIFICATION UNIT MODEL AND HIGH FREQUENCY RESISTANCE

BACKGROUND OF THE INVENTION

The present invention relates generally to providing an estimation of a fuel cell stack inlet and outlet humidity levels, and more particularly to devices and methods for determining relative humidity during fuel cell operational transients without requiring relative humidity feedback from a sensor.

In a typical fuel cell system, hydrogen or a hydrogen-rich gas is supplied through a flowpath to the anode side of a fuel cell while oxygen (such as in the form of atmospheric oxygen) is supplied through a separate flowpath to the cathode side of the fuel cell. Catalysts, typically in the form of a noble metal such as platinum, are placed at the anode and cathode to facilitate the electrochemical conversion of hydrogen and oxygen into electrons and positively charged ions (for the hydrogen) and negatively charge ions (for the oxygen). The electrons flow through an external electrically-conductive circuit (such as a load) to perform useful work, and then on to the cathode. An electrolyte layer separates the anode from the cathode to allow the selective passage of ions to pass from the anode to the cathode. The combination of the positively and negatively charged ions at the cathode results in the production of non-polluting water as a by product of the reaction. In one form of fuel cell, called the proton exchange membrane (PEM) fuel cell, the electrolyte layer is in the form of a proton-transmissive membrane; the layered structure formed by this PEM sandwiched between the anode and cathode is commonly referred to as a PEM electrode assembly (MEA). Each MEA forms a single fuel cell, and many such single cells can be combined to form a fuel cell stack, increasing the power output thereof. Multiple stacks can be coupled together to further increase power output. The PEM fuel cell has shown particular promise for vehicular and related mobile applications.

Balanced moisture or humidity levels are required in the PEM fuel cell to ensure proper operation and durability. For example, it is important to avoid having too much water in the fuel cell, which can result in the blockage of reactants to the porous anode and cathode. Contrarily, too little hydration limits electrical conductivity of the membrane, and in extreme cases can lead to it wearing out prematurely. As such, it is beneficial to have knowledge of the hydration level within a fuel cell, especially PEM fuel cells that frequently operate at elevated temperatures that can impact a cell's hydration level.

High frequency resistance (HFR) is a known diagnostic technique for indirectly measuring MEA hydration. In a typical HFR configuration, sensors use a high-frequency ripple current to measure fuel cell resistance. Although such an approach is particularly sensitive to changes in relative humidity (RH), its sensitivity to other fuel cell conditions can cause erroneous measurements. In other words, the measured fuel cell resistance, or HFR value, is measuring the resistance of the build-up of water in the PEM of the fuel cell and not the wetness of the air. The air has to dry or dampen the PEM for a change to occur in the HFR value. One particular weakness of HFR-based estimation is the inherent lag in HFR, especially at low flow conditions which exhibits a hysteresis response in the HFR value. This hysteresis response means that in situations where rapid inlet humidity changes are present, such changes will not match an average stack HFR value that often lags. This lag may cause a controller to over-dry the stack; such over-drying is particularly prevalent at the cathode inlet, where chemical degradation and consequent PEM thinning may ensue. As such, it remains challenging and difficult to provide accurate estimations of relative humidity levels in a fuel cell system. This is particularly acute in vehicular-based fuel cell systems where reliability, weight and cost further compound the challenges. In conventional configurations, to accomplish monitoring the RH of the stack, a separate humidity sensor is used to measure the RH of the air flowing through the stack. The humidity sensor allows a control system to determine the humidity of the PEM without succumbing to the lag or hysteresis response of the HFR sensors in response to operational transients. Unfortunately, such humidity sensors add cost and complexity to the system.

A cathode humidification unit (CHU) model algorithm is used to interpret and modify the RH of the stack. Variations in the effectiveness of the CHU model may be due to part-to-part variation, degradation, or even leaks. Degradation may depend on usage profile and may be different from vehicle-to-vehicle. Furthermore, the CHU model uses an outlet RH value of the stack for the calculations of the RH of the stack. If the outlet RH value has an error, (e.g. due to error in stoichiometry estimation, temperature feedback or even variation in anode water crossover) this would impact the CHU model's ability to calculate the RH of the stack and cause a circular reference.

A reference signal would benefit the CHU model to calculate the RH of the stack without the need for the humidity sensor.

SUMMARY OF THE INVENTION

In accordance with one aspect of the teachings of the present invention, an apparatus to determine the relative humidity of a fuel cell system. The fuel cell system relies on a relative humidity control apparatus to control the relative humidity of a fuel cell stack. The relative humidity control apparatus uses a controller, a cathode humidification unit, a valve, a first device, and a second device, and a plurality of fuel cells to estimate the relative humidity of the fuel cell stack. A controller is cooperative with the second device and the first device and receives the valve signal and the high frequency resistance value from both devices respectively. The controller controls the relative humidity through changes in the position of the valve fluidly disposed in a plurality of flowpaths of the fuel cell system based on at least one of the valve signal and the high frequency resistance value. In one form, the relative humidity of the fuel cell system is determined without the need of a humidity sensor.

In accordance with another aspect of the teachings of the invention a method of estimating the relative humidity during operational transients of a fuel cell system is disclosed. The relative humidity is estimated by receiving a valve signal from a second device and a high frequency resistance value from a first device. The second device is configured to transmit the valve signal where the valve signal corresponds to a position of a valve fluidly disposed in a plurality of flowpaths of the fuel cell system. The first device is configured to transmit the high frequency resistance value from the fuel cell stack. The relative humidity is estimated by executing a plurality of algorithms in a processor of a controller. The first algorithm is a cathode humidification unit (CHU) model and the second is an adaptive algorithm. The adaptive algorithm modifies the CHU model by evaluating the valve signal and high frequency resistance.

In accordance with yet another aspect of the teachings of the invention, a method of operating a relative humidity control apparatus and estimating the relative humidity during operational transients of a fuel cell system is disclosed. The relative humidity control apparatus uses a controller, a cathode humidification unit, a valve, a first device, and a second device, and a plurality of fuel cells to estimate the relative humidity of the fuel cell stack. A controller is cooperative with the second device and the first device and receives the valve signal and the high frequency resistance value from both devices respectively. The relative humidity estimates the relative humidity of a plurality of fuel cells by executing a cathode humidification unit model and an adaptive algorithm in a processor of a controller cooperative with the first device and the second device. The adaptive algorithm modifies the cathode humidification unit model by evaluating the valve signal and high frequency resistance value to estimate the relative humidity of the fuel cell stack. The controller controls the relative humidity through changes in the position of the valve fluidly disposed in a plurality of flowpaths of the fuel cell system based on the estimation of the relative humidity of the fuel cell stack.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

The embodiments of the invention described in the present disclosure do not rely on a separate and distinct humidity sensor to determine a RH of a fuel cell stack. Instead it utlizes signals from sensors monitoring the stack, or a stack-as-sensor approach, to determine the RH value for the fuel cell stack without the need for the humidity sensor. The stack-as-sensor approach uses a HFR value of the fuel cell stack and together with knowledge of a valve position and an adaptive CHU model, the RH of the fuel cell stack may be determined.

The HFR value uses a second device (described below) to measure an amount of water or hydration in a PEM of the fuel cell. The second device may be a resistance sensor used to measure a resistance of an amount of water or hydration of the PEM. The RH of an air flowing through the PEM may be directly determined by the HFR value. A change in the amount of water in the PEM may occur for a change to be reflected in the HFR value. A time it takes for the air to dry the PEM or saturate the PEM with water may appear in the HFR value as a lag of time between the change in the RH of the air and a change in the HFR value.

Figure 1:
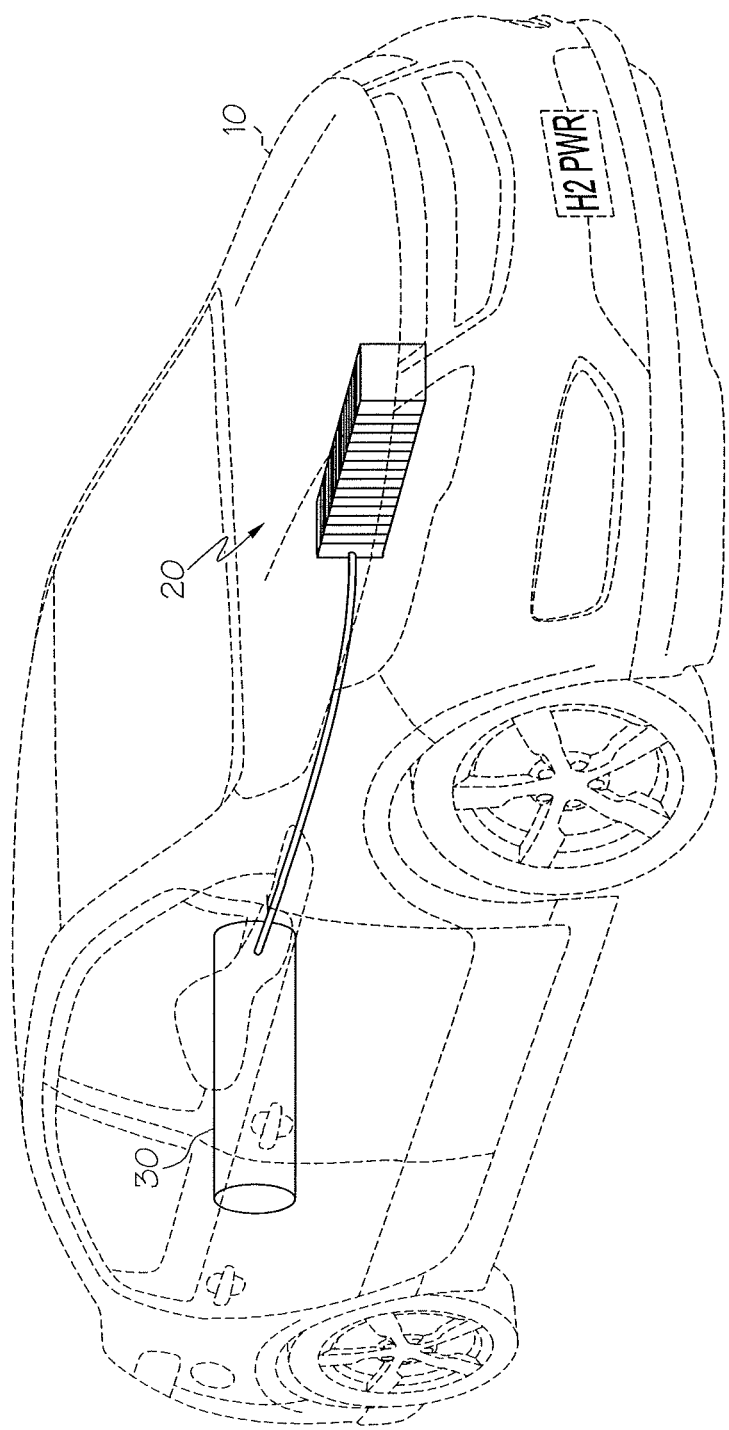
FIG. 1 shows an illustration of a vehicle.

Referring first to FIG. 1, a vehicle 10 (e.g., a car, bus, truck, or motorcycle) powered by a fuel cell system is shown. Some components of the fuel cell system may include numerous fuel cells (preferably arranged as one or more stacks 20) that convert stored gaseous fuel from a tank 30 into electricity to provide electric power to engine (not shown) that may be a fully electric or a hybrid electric engine (e.g., an engine that uses both electricity and petroleum-based combustion for propulsion power), utilizes the power from the fuel cell system to propel the vehicle 10. The fuel cell system may also include any number of valves, compressors, tubing, temperature regulators, electrical storage devices (e.g., batteries, ultra-capacitors or the like), and controllers to deliver the fuel from the tank 30 or tanks to the fuel cell system, as well as to provide control over the operation of fuel cell system. Such controllers will be discussed in more detail below.

Any number of different types of fuel cells may be used in the fuel cell system (e.g., metal hydride fuel cells, alkaline fuel cells, electrogalvanic fuel cells, or any other type of known fuel cells). Multiple fuel cells may also be combined in series and/or parallel within the fuel cell system as the stack 20 in order to produce a higher voltage and/or current yield by the fuel cell system. The produced electrical power may be supplied directly to an engine (not shown) or stored within an electrical storage device (not shown) for later use by vehicle 10.

Figure 2:
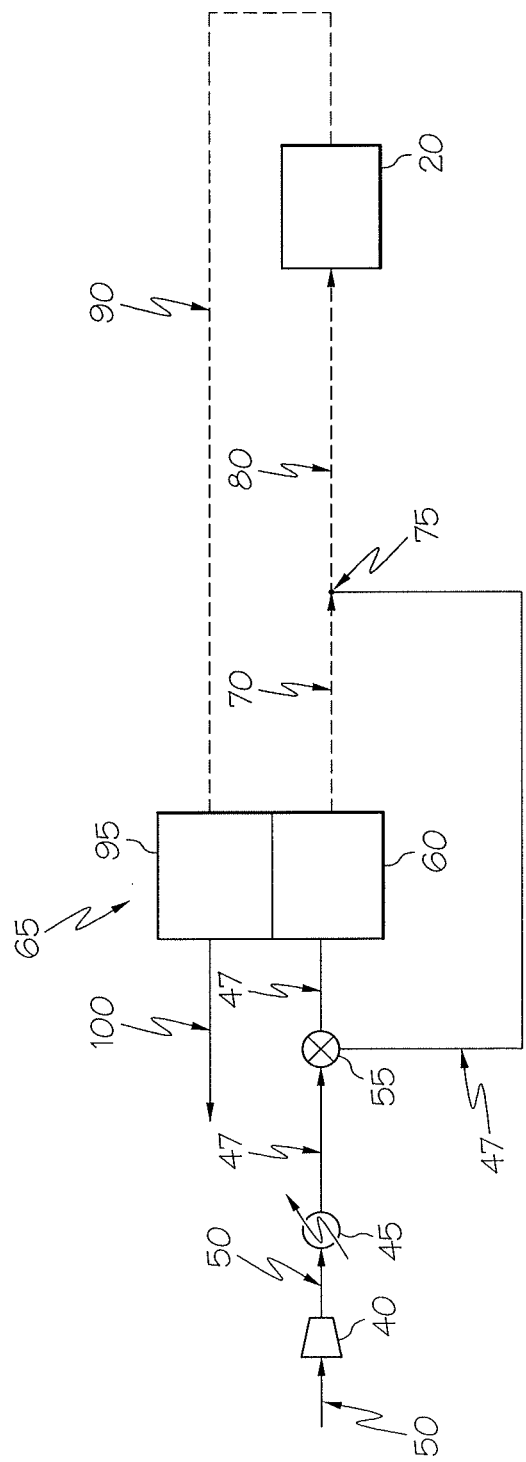
FIG. 2 illustrates a flowpath for air through a fuel cell system.
Figure 3:
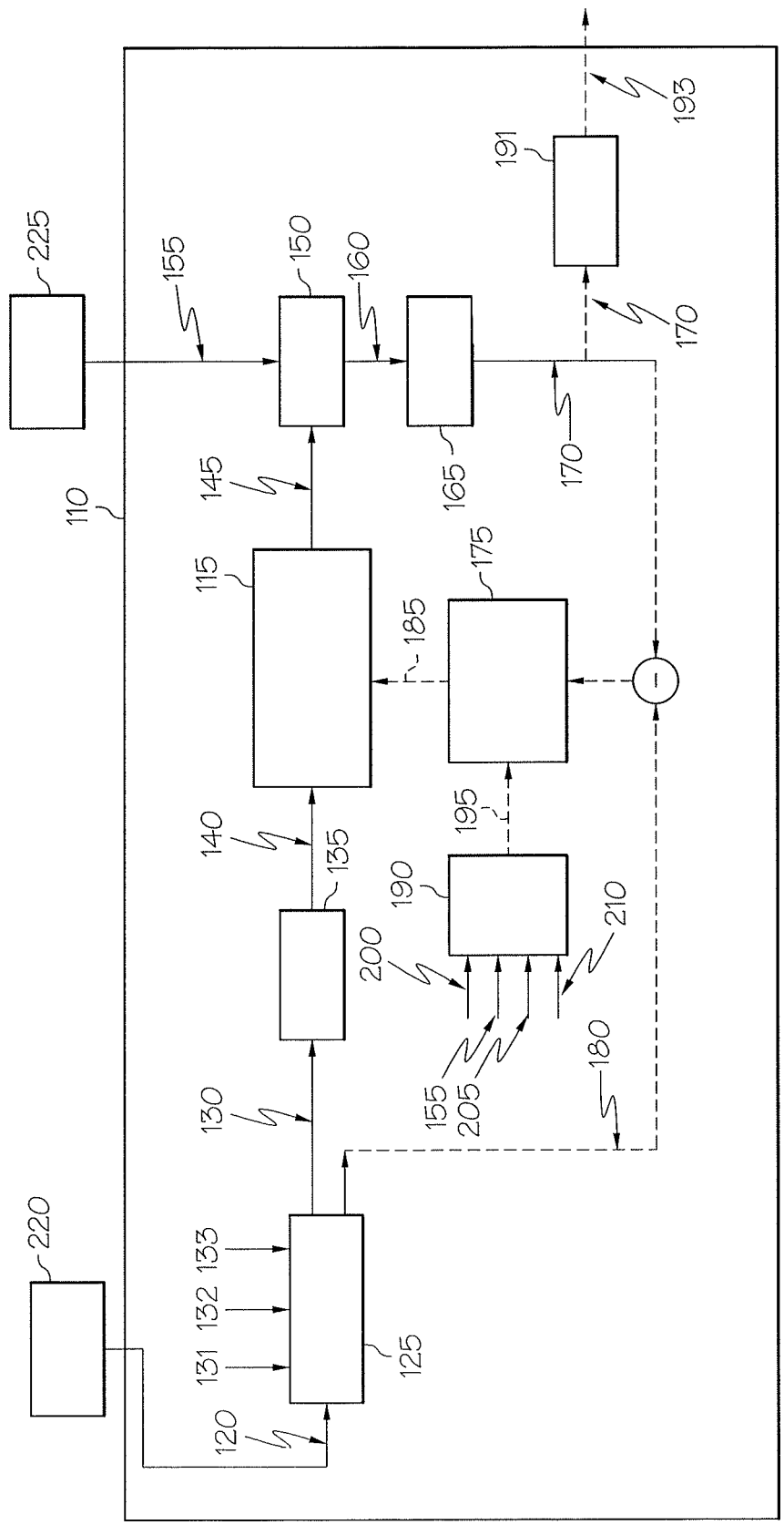
FIG. 3 is schematic view of a CHU model.

FIG. 2 illustrates a flowpath for air 50 through the fuel cell system. The air 50 enters a compressor 40 where the air 50 may be compressed. The air 50 leaves the compressor 40 and enters a heat exchanger 45 where the RH of the air 50 is reduced to produce a dry air 47. The dry air 47 enters a valve 55 where the dry air 47 may be diverted to enter a tube side 60 of a cathode humidification unit (CHU) 65 or diverted around the tube side 60. The valve 55 may vary the amount of dry air 47 being diverted around the tube side 60 by a percent opening ranging from 0 to 100 percent. The CHU 65 may be used to increase the RH of the dry air 47 to produce a humid air 70. The percent opening by the valve 55 is controlled by a controller 110 as shown in FIG. 3. At a mixing point 75, the dry air 47 and the humid air 70 mix to create a mixed air 80 of a specific RH as determined by the control module.

The mixed air 80 enters the stack 20 and participates in the energy production process as described in the background section. An exit air 90 leaves the stack 20 either at a higher RH or a lower RH depending on the amount of water in the PEM, an airflow speed over the PEM, and the RH of the mixed air 80. The exit air 90 may be used by the CHU 65 on a shell side 95 to increase the RH of the air 50 to produce the humid air 70. The exit air 90 is exhausted from the vehicle as exhaust 100.

FIG. 3 is schematic view of a CHU model 115 used by the controller 110 to determine a hydration of the stack 20 as shown in FIG. 2. The HFR value 120 from the first device 220 may be inputted into a HFR-based estimate algorithm 125. The HFR-based estimate algorithm 125 calculates a stack outlet RH value 130 using air flow 131, temperature 132, pressure 133, and current inputs as described below in greater detail. The stack outlet RH value 130 is inputted into a first temperature correction algorithm 135 which may adjust the HFR RH estimation value 130 to determine a RH shell value 140. The RH shell value 140 may be the RH of the exit air 90 as it exits the stack 20 corrected for any heat loss in a piping network (not shown) between the stack 20 and the shell side 95 of the CHU 65. The RH shell value 140 may be used by the CHU model 115 to determine a RH tube value 145. The RH tube value 145 is an estimate of the RH of the humid air 70 exiting the tube side 60 of the CHU 65. The RH tube value 145 is calculated based on the CHU model as described below.

A second device 225 produces a valve signal 155 corresponding to the percent opening of the valve 55. Alternatively, the second device 225 may also produce the valve signal 155 corresponding to a valve command signal 250 as describe below. A mixing algorithm 150 may use the RH tube value 145 and the valve signal 155 to determine a mixed air RH value 160. The valve signal 155 is a bypass ratio ($\alpha$) which may be indicative of the percentage of opening of the valve 55. The mixed air RH value 160 is the RH of the mixed air 80 at the mixing point 75. A second temperature algorithm 165 may be used to normalize the mixed air RH value 160 to determine a final RH value 170 which is a stack 20 inlet temperature as described below in greater detail.

An adaptive algorithm 175 may use the final RH value 170 and a stack inlet RH value 180 to output a parameter 185 that may be used by the CHU model 115 to modify the RH tube value 145. By modifying the RH tube value 145, the final RH value 170 may more accurately indicate a RH value close to an actual RH value in the stack 20. An adapt enable algorithm defines a trigger criteria when the adaptive algorithm 175 may modify the RH tube value 145 based on determining when HFR-based inlet RH estimate is valid. The adapt enable 190 enables the adaptive algorithm 175 via an enable signal 195. The adapt enable 190 may stop the adaptive algorithm 175 when a load value 200 or the valve signal 155 are changing rapidly. Furthermore, if a stack temperature value 205 is too low or if a stack flooded value 210 indicates the stack is too wet, then the adapt enable 190 may stop the adaptive algorithm 175.

A Water Buffer Model 191 (WBM) is an algorithm which outputs a water value 193 by taking the stack inlet RH value 180 and defining how much water to add to the stack 20 to reach the final RH value 170. The controller 110 uses the water value 193 to add a quantity of water to the dry air 47 to change the RH of the stack 20.

Lag in the HFR value 120 is a dynamic issue in drive cycles with large transitions between idle and 75% to maximum power. The lag does not significantly impact typical drive cycles, such as Environmental Protection Agency (EPA) city and highway cycles, due to these cycles being low power cycles. The stack 20 operates wet due to a slow thermal response when there is a low power request and less heat is produced. At the end of the drive cycle the operation goes to near idle where the lag in the HFR value 120 is large. Thus the combination of the stack 20 operating wet and the transition to idle makes the lag even worse. The valve 55 is used to estimate the bypass ratio (α). The essence of solution to the lag problem is to factor in the valve 55 upstream that changes the valve signal 155 as the bypass ratio (α) changes to improve the accuracy of the final RH value 170. For example, if the stack 20 is operating at low air flows (idle) and the stack 20 is indicating that it is hydrated, the HFR value 120 is low. On the contrary, if the valve 55 position is indicating that all the airflow is being diverted around the CHU 65 (i.e. α=0) then the mixed air 80 may be dry and over time the stack 20 inlet will dry out and eventually may show up in a change in the HFR value 120.

The CHU model 115 takes advantage of the bypass ratio (α) to determine the RH of the mixed air 80. Furthermore the CHU model 115 may have parameters that may be adapted online based on the stack inlet RH value 180 of the stack 20. The CHU model 115 is utilized that relates the shell side 95 and the tube side 60 RH as an equilibrium relation shown below in equation 1:

$$RH_{in}^{T_{tube\_out}} = \varepsilon \cdot RH_{out}^{T_{shell\_in}} \qquad (1)$$

where ε is an equilibrium relation that is a function of air flowrate to account for low "effectiveness" of the CHU 65 at high air flow rates. The equilibrium relation may be calibrated for the CHU model 115 and may not degrade over time. The bypass ratio (α) may be calculated based on valve commands and not valve position feedbacks.

The adaptive algorithm 175 may estimate the CHU parameter ($\varepsilon(\dot{m}_{air})$) for different flow conditions such that the CHU model 115 estimate matches reference inlet RH if the stack 20 when the HFR value 120 may be trusted. In essence the adaptive algorithm (ε) 175 may be solving the following optimization found in equation 2 below:

$$\underset{\varepsilon}{\text{minimize}} \ |RH_{in}^{HFR} - RH_{in}^{HFR\_CHU}(\varepsilon)| \qquad (2)$$

The optimization is broken up into bins spanning low and high flowrates. This optimization problem is solved online via PIA algorithm. An assumption is made on the airflow restrictions (Kv) in the system or by learning valve $K_v$ in anode subsystem and modifying it for CHU adaption.

The controller 110 cooperates with the first device 220 and the second device 225 to receive the valve signal 155 and HFR value 120. The controller 110 cooperates either electrically, optically, wirelessly, or mechanically with the first device 220 and the second device 225. The controller 110 comprising at least one processor (not shown) and a computer readable medium (not shown) such that instructions stored in the computer readable medium are executed by the at least one processor to control through changes in the position of the valve 55 a RH of a plurality of fuel cells based on at least one of the valve signal 155 and HFR value 120.

Figure 4:
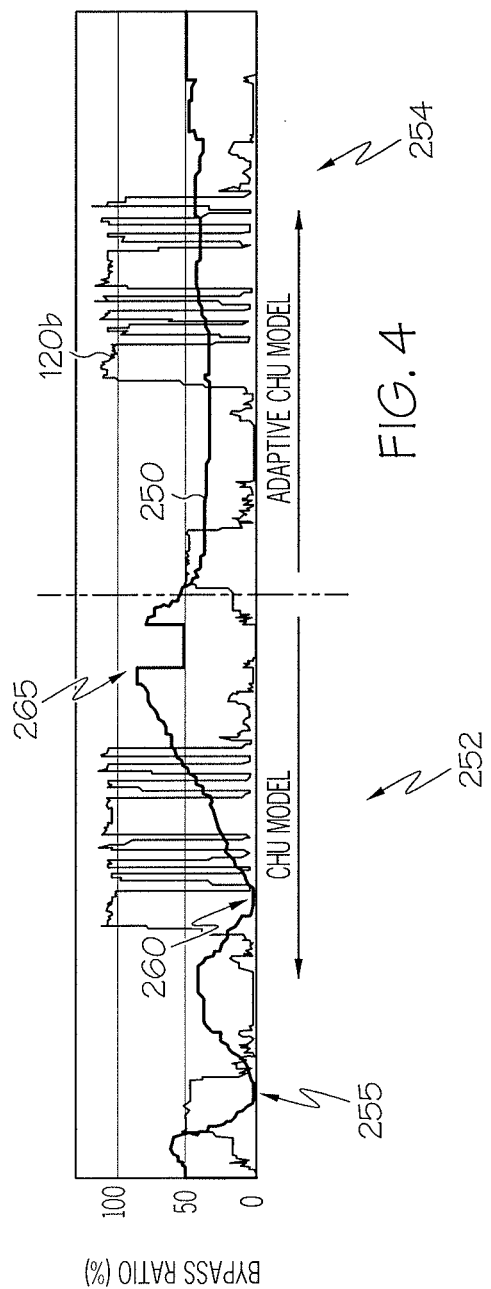
FIG. 4 illustrates the CHU model modulating a valve to adjust the relative humidity of a stack in the fuel cell system.

FIG. 4 illustrates the CHU model 115 modulating the valve 55 to adjust the RH of the stack 20. Refer to FIGS. 2 and 3. A CHU model plot 252 depicts the CHU model 115 estimating both the stack inlet RH value 180 and the stack outlet RH value 130 purely based on the HFR value 120 only and sending a valve command signal 250 to the valve 55 to adjust the RH of the stack 20. An adaptive CHU model plot 254 depicts the CHU model 115 estimating both the stack inlet RH value 180 and the stack outlet RH value 130 based on the HFR value 120 and using the adaptive algorithm 175 to determine the RH of the stack 20 and sending a valve command signal 250 to the valve 55 to adjust the RH of the stack 20.

FIG. 4 additionally illustrates a stable valve command signal 250 using the adaptive algorithm 175 than using the CHU model 115 as a standalone algorithm. Furthermore, the adaptive algorithm 175 may reduce the effect of the lag on the valve command signal 250 as shown by the lack of extreme valve command signals 250 as illustrated by a first dip 255, a second dip 260, and a crest 265. The first dip 255 and the second dip 260 illustrate where the CHU model 115 may be catching up the actual RH value of the stack 20 and overshooting the actual value with the crest 265.

The adaptive algorithm 175 may reduce the chance for a dry out of the PEM of the stack and may show an improvement in dry out prevention. The valve command signal 250 for the valve 55 is smooth and may reduce equipment fatigue and promote a longer service life. For example, during a cathode purge, the controller 110 may try to bring the RH of the stack 20 to a RH value of around 35% humidity. Without the adaptive algorithm 175 aiding the CHU model 115, the stack 20 may reach a RH value of 20% and may severely dry out the stack 20. With the adaptive algorithm 175 aiding the CHU model 115, the stack 20 maintains the RH value of 35%. Furthermore, when the fluctuation of the valve command signal 250 may be greatly reduced during the normal drive cycle.

The CHU model 115 overshoots the desired control point due to the lag in the HFR value 120. This occurs due to the fast transients in the drive cycle and the amount of time it takes the HFR value 120 to register a change in the RH of the stack 20 of FIG. 2. The CHU model 115 side illustrates in the wet overshoot (0% water vapor transfer unit (WVT) bypass) that occurs at the first dip 255 and the second dip 260 and the dryout (saturated 75% WVT bypass) that occurs at the crest 265. The adaptive algorithm 175 side of FIG. 4 illustrates the same drive cycle without the extreme excursion in the valve signal 155.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, for the purposes of describing and defining the present invention, it is noted that the term "device" is utilized herein to represent a combination of components and individual components, regardless of whether the components are combined with other components. For example, a "device" according to the present invention may comprise an electrochemical conversion assembly or fuel cell, as well as a larger structure (such as a vehicle) that incorporates an electrochemical conversion assembly according to the present invention. Moreover, the term "substantially" is utilized herein to represent the inherent degree of uncertainty that may be attributed to any quantitative comparison, value, measurement, or other representation. As such, it may represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

We claim:

1. A fuel cell system comprising:
    a plurality of fuel cells, each of the fuel cells comprising an anode, a cathode, a proton exchange membrane disposed between the anode and the cathode, and a plurality of flowpaths configured to convey hydrogen and oxygen to the anode and the cathode respectively; and
    a relative humidity control apparatus comprising:
        a cathode humidification unit;
        a valve configured to change a relative humidity of the proton exchange membrane by selectively bypassing the oxygen around the cathode humidification unit and to the plurality of flowpaths;
        a second device configured to produce a valve signal corresponding to a position of the valve;
        a first device configured to produce a high frequency resistance value that corresponds to the relative humidity of the proton exchange membrane; and
        a controller cooperative with the first device and the second device to receive the valve signal and the high frequency resistance value, the controller comprising at least one processor and a computer readable medium such that instructions stored in the computer readable medium are executed by the at least one processor to control, through changes in the position of the valve, the relative humidity of the proton exchange membrane wherein:
            the instructions include a cathode humidification unit model and an adaptive algorithm,
            the cathode humidification unit model estimates the humidity of the proton exchange membrane and generates a valve control signal to change the position of the valve to adjust the relative humidity of the proton exchange membrane, and
            the adaptive algorithm evaluates a final relative humidity value derived from a relative humidity tube value and the valve signal and a stack inlet relative humidity value derived from the high frequency resistance value to estimate the relative humidity of the proton exchange membrane and transmits an adaptive signal to modify the cathode humidification unit model to reduce the effect of high frequency resistance value lag on the valve control signal.

2. The fuel cell system of claim 1, wherein the first device and the second device are configured to be part of the controller.

3. The fuel cell system of claim 1, wherein a humidity sensor is not used.

4. The fuel cell system of claim 1, wherein:
    the instructions comprise an adapt enable algorithm;
    the adapt enable algorithm generates an enable signal when an relative humidity estimate at the stack inlet is valid;
    the relative humidity estimate at the stack inlet is not valid when at least one of a load value is changing rapidly, the valve signal is changing rapidly, a stack temperature value is too low, and a stack flooded value is too wet; and
    the adapt enable algorithm enables the adaptive algorithm to transmit the adaptive signal to the cathode humidification unit model while the enable signal is generated.

5. The fuel cell system of claim 1 wherein:
    the instructions comprise a high frequency resistance-based estimate algorithm;
    the high frequency resistance-based estimate algorithm calculates a stack outlet relative humidity value using the high frequency resistance value and stack air flow, temperature, pressure, and current values; and
    the stack outlet relative humidity value is used by the cathode humidification unit model to estimate the humidity of the proton exchange membrane.

6. The fuel cell system of claim 5 comprises a piping network and wherein:
    the instructions comprise a first temperature correction algorithm; and
    the first temperature correction algorithm adjusts the stack outlet relative humidity value to account for any heat loss in the piping network.

7. The fuel cell system of claim 1 wherein:
    the instructions comprise a mixing algorithm;
    the mixing algorithm calculates the final relative humidity value from the relative humidity tube value and the valve signal; and
    the relative humidity tube value is derived from the cathode humidification unit model.

8. The fuel cell system of claim 7 wherein:
    the instructions comprise a second temperature correction algorithm; and
    the second temperature correction algorithm adjusts the final relative humidity value based on a stack inlet temperature.

9. The fuel cell system of claim 1 wherein the transition of the fuel cell to idle induces high frequency resistance lag in the high frequency resistance value.

* * * * *